March 5, 1957 A. D. EHRENFRIED 2,784,400
SIMULTANEOUS LOBING WITH MONITORED DUAL RECEIVER
Filed Sept. 14, 1945 2 Sheets-Sheet 1

INVENTOR
ALBERT D. EHRENFRIED
BY
ATTORNEY

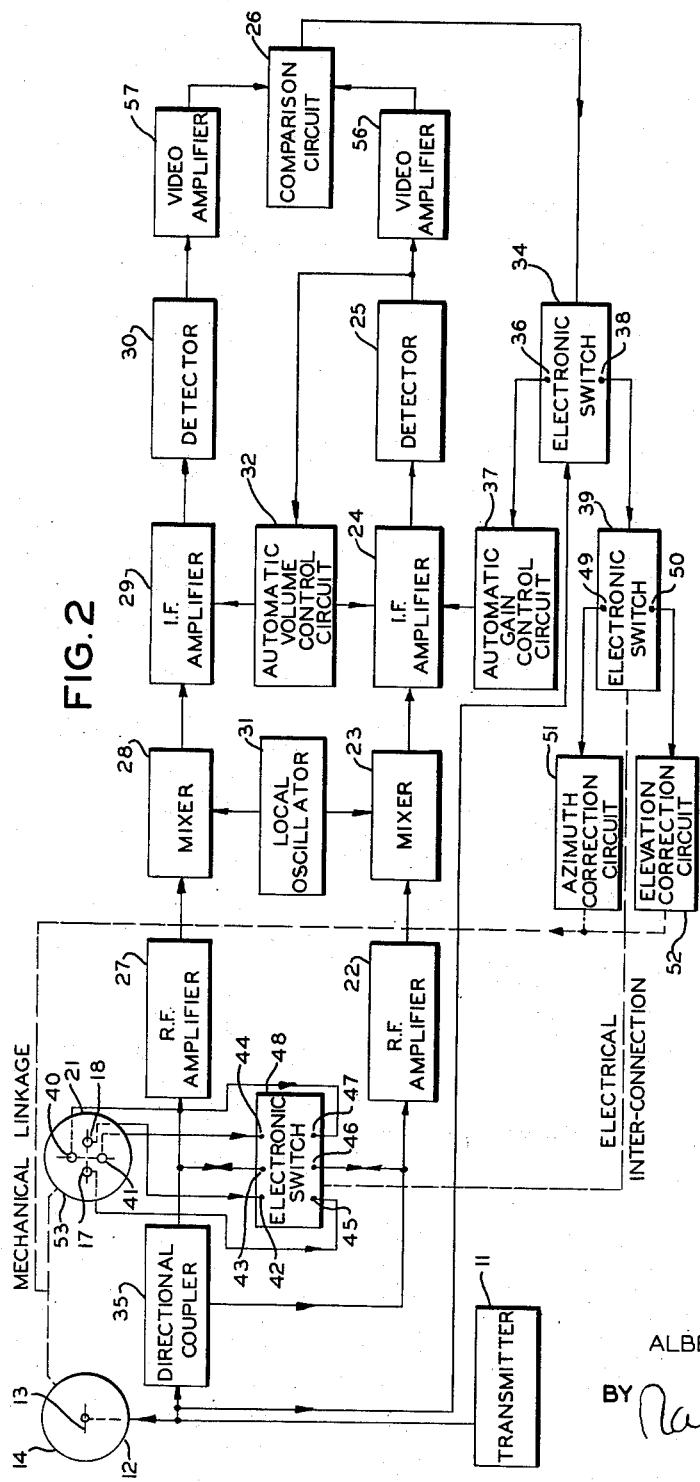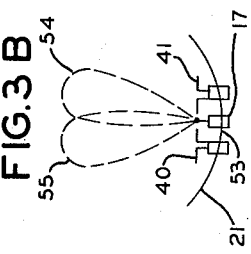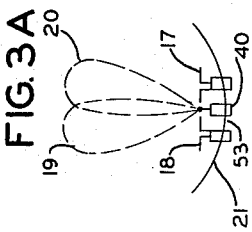
INVENTOR
ALBERT D. EHRENFRIED
ATTORNEY

United States Patent Office 2,784,400
Patented Mar. 5, 1957

2,784,400

SIMULTANEOUS LOBING WITH MONITORED DUAL RECEIVER

Albert D. Ehrenfried, Boston, Mass., assignor, by mesne assignments, to the United States of America as represented by the Secretary of the Navy Application September 14, 1945, Serial No. 616,400

9 Claims. (Cl. 343—7.4)

This invention relates to a means for detecting the presence and determining the direction of an object in space by simultaneous reception of energy reflected therefrom by a plurality of energy receiving devices, and more particularly to a means whereby a dual channel receiver-comparison circuit both converts said simultaneous plurality of signals into a correction signal and acts as a monitor of its own output so that the gain of both channels is maintained identical.

In devices for detecting the presence of an object by energy reflected therefrom, most methods of reasonably accurate azimuth discrimination based on the principle of comparing two signals received on either side of a target (such as lobe switching or conical scanning) have the undesirable feature that the two signals compared are not received at the same instant of time and are therefore influenced differently by the reflectance of the target and atmospheric conditions. Such fading and modulating effects cause considerable uneven pulse jitter and tend to make automatic tracking unstable. Previous methods of overcoming these difficulties have involved the basic principle of simultaneous lobing, but, since they used a single receiver channel, and since the two incoming signals can not be amplified simultaneously in the single receiver channel, have required the use of an auxiliary delay line in one receiving antenna circuit thereby introducing a large attenuation of signal strength in the system and hence decreasing its range.

Accordingly, it is an object of this invention to provide a means for simultaneously receiving electromagnetic reflected signals from either side of an object in space, whereby such reflected signals may be combined for the purpose of azimuth and/or elevation discrimination without using a delay line or similar circuit introducing energy attenuation.

Another object is to provide a means for comparing said reflected signals other than by using a device which introduces energy attenuation.

A further object is to provide a means for comparing said reflected signals other than by using a device which introduces energy attenuation, the output of said means feeding a supplementary means whereby the object can be automatically tracked if it moves in space.

Other and further objects will appear in the course of the following description, when taken with the accompanying drawings in which:

Fig. 2 shows a schematic block diagram of an alternative embodiment involving the use of four receiving dipoles.

Figure 1:
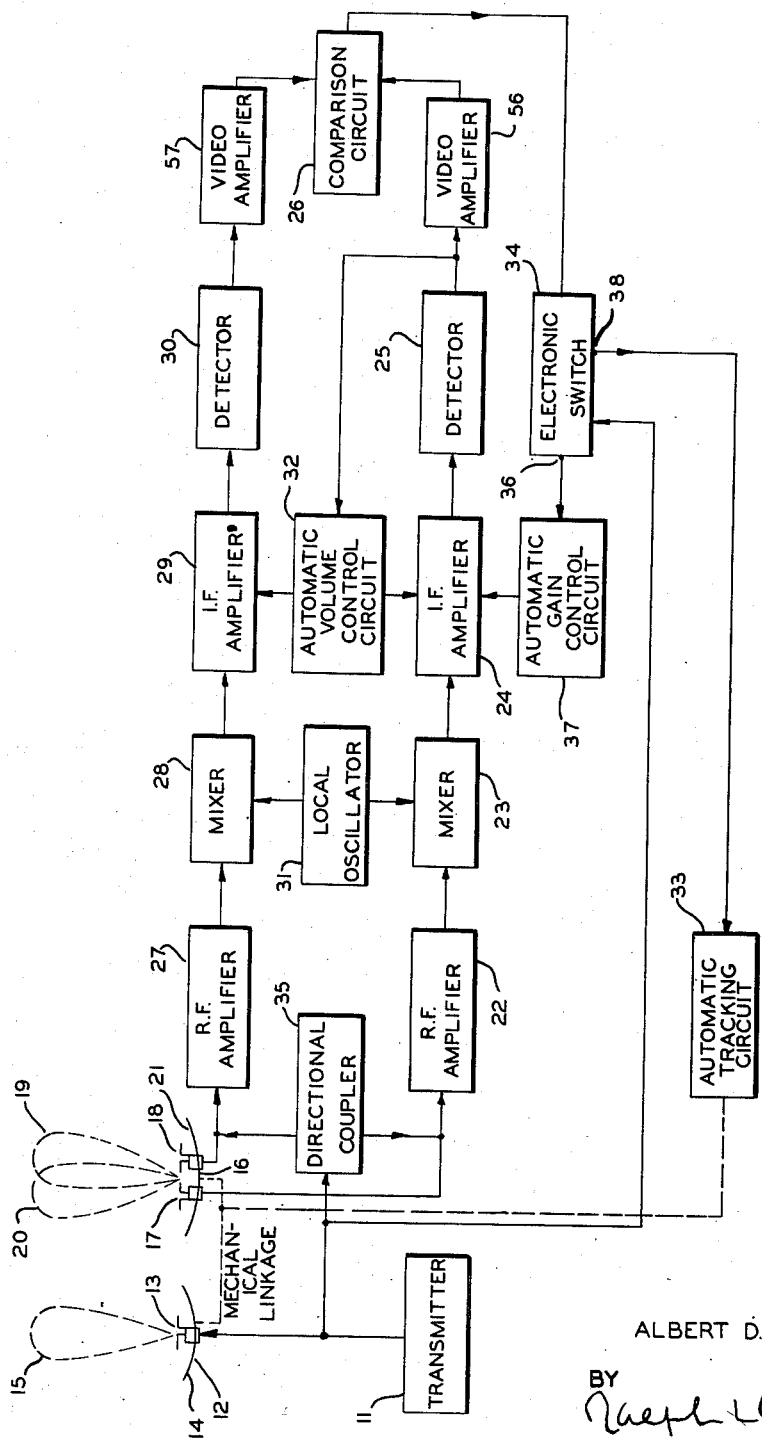
Fig. 1 shows a schematic block diagram of an embodiment of this invention involving the use of two receiving dipoles.

Figs. 3a, 3b, and 3c show cross sectional views of the antennas of Fig. 2 with typical antenna beam patterns.

In Fig. 1 a transmitter 11 is a source of electromagnetic energy which is fed to a radiating antenna 12, comprising a dipole 13 located at the focal point of parabolic reflector 14. This antenna, which is directed toward any desired object in space by suitable mechanical means, has a directional beam pattern 15. Energy reflected from said desired object will impinge upon the receiving antenna 16, comprising dipoles 17 and 18 located on either side of the focal point of parabolic reflector 21 and having directional beam patterns 19 and 20, respectively, said beam patterns diverging by some fixed angle. Suitable mechanical linkage is provided between antennas 12 and 16 so that both antennas point at the same position in space at all times. Energy received by dipole 17 is coupled into radio frequency amplifier 22, thence to mixer 23, where it is converted to an intermediate frequency signal, amplified by intermediate frequency amplifier 24, converted into an audio frequency signal in detector 25, amplified by video amplifier 56, and then conveyed to one input of comparison circuit 26. Energy received by dipole 18 passes through similar circuits 27, 28, 29, 30, and 57 and then enters a second input of comparison circuit 26. Circuits 22 and 27 are identical, as are 23 and 28, 24 and 29, 25 and 30, and 56 and 57. A single local oscillator 31 feeds both mixers 23 and 28 in order to eliminate any intermediate frequency instability or drifting between the two similar receiver channels. An automatic volume control circuit 32 is suitably connected to both intermediate frequency amplifiers 24 and 29 to vary the gain of said amplifiers simultaneously as necessary, according to the strength of the energy received from said object by dipole 17, in order to prevent signal saturation which would distort signal amplitude information into comparison circuit 26.

Identical gains of the two receiver channels are obtained in a novel manner, using the same comparison circuit 26 that is used for controlling the automatic tracking circuit 33. Whenever transmitter 11 provides energy to antenna 12, some of this energy is also conveyed to electronic switch 34 and directional coupler 35 as a test signal for securing identical gains of said two channels. The purpose of this directional coupler is to allow electromagnetic energy to pass freely from transmitter 11 to radio frequency amplifiers 22 and 27, but not in the reverse direction. Equal amounts of said test signal energy flow into each amplifier. Also the construction of this directional coupler is such that no energy from dipole 17 can leak into radio frequency amplifier 27 through the directional coupler and similarly no energy from dipole 18 can leak into radio frequency amplifier 22. Said equal amounts of test signal energy fed into the inputs of radio frequency amplifiers 22 and 27 result in equal signals at the two input circuits of comparison circuit 26 if the gains of the two receiver channels are identical. At the same time the test signal energy fed into electronic switch 34 has operated it so that the output of comparison circuit 26 is disconnected from terminal 38, and connected to terminal 36. Terminal 36 is the input to automatic gain control circuit 37, which is connected to intermediate frequency amplifier 24 and varies its gain independently of that of intermediate frequency amplifier 29. If, then, the gains of the two receiver channels are identical, there will be no output from comparison circuit 26 and automatic gain control circuit 37 will hence not modify the gain of intermediate frequency amplifier 24. However, in the event that the gains of the two receiver channels are not identical, then the output of comparison circuit 26 due to the aforesaid test signal energy inputs will be something other than zero and will control automatic gain control circuit 37 in a manner whereby the gain of intermediate frequency amplifier 24 is varied so that the overall gains of both receiver channels become identical. Whenever transmitter 11 stops producing an energy output, electronic switch 34 disconnects the output of comparison circuit 26 from terminal 36 and connects it to terminal 38, which is the input to automatic tracking circuit 33. In practice it may be found that it is not necessary to have automatic gain control circuit 37 modify the gain of said receiver channel each time transmitter 11 produces an energy output. In this case, electronic switch 34 may be arranged in a manner apparent to those skilled in the art so that the output of comparison circuit 26 will be connected to terminal 36 only every 2nd, 3rd, or "Nth" time transmitter 11 is pulsed, whichever is the minimum necessary to keep the gains of the two receiver channels identical.

Since the gains of both receiver channels are thus maintained identical, if antennas 12 and 16 are pointed directly at said object in space when energy is reflected therefrom, then the amounts of energy received by dipoles 17 and 18 are equal, the two inputs to the comparison circuit 26 are equal, and the output (error signal) of said comparison circuit will be zero. If antennas 12 and 16 are not pointed directly at said object, the output (error signal) will have some finite value and phase, dependent upon the deviation of the axes of said antennas from the direction of said object. Said output is now connected, due to the action of electronic switch 34, through terminal 38 to the input of automatic tracking circuit 33, which is designed to convert said output (error signal) into a mechanical signal, which by suitable mechanical linkage will direct antennas 12 and 16 toward the weaker received energy signal and thus provide automatic tracking for said antennas.

In Fig. 2 circuit units which are similar to those in Fig. 1 have been identified by the same numerals. The overall system is the same as Fig. 1 except that two additional receiving dipoles, two additional electronic switches, and an additional automatic tracking circuit have been added so that the system is adapted to elevation as well as azimuth corrections while using only the single dual channel receiver-comparison circuit of Fig. 1. The circuit operation is exactly the same as that given for Fig. 1 and need not be repeated except to explain the operation involving the additional electronic switches.

As shown in Fig. 2, receiving dipoles 17 and 18 are located in a horizontal plane and 40 and 41 in a vertical plane. Each is displaced slightly from the focal point of parabolic reflector 21, so that, as shown in Fig. 3a, beam patterns similar to 19 and 20, diverging by some fixed angle, are produced by horizontal dipoles 17 and 18 respectively. As shown in Fig. 3b, similar beam patterns 54 and 55, diverging by some fixed angle, are produced by vertical dipoles 40 and 41 respectively. As shown in Fig. 3c, beam pattern 15 for transmitting dipole 13 (located at the focal point of reflector 14) is the same as in Fig. 1.

The cycle of the action of electronic switches 39 and 48 is divided into two parts. During the first half of the cycle, terminal 38 is connected to 49, 43 to 42, and 46 to 45. During the second half of the cycle, 38 is connected to 50, 43 to 44, and 46 to 47. A suitable electrical interconnection between the two switches insures that such switching action occurs simultaneously in each switch. Suitable control means are provided within electronic switch 48 so that the first half of said cycle occurs during one received energy pulse, the second half during the next, the first during the next, etc. Thus it is evident, due to the action of electronic switches 39 and 48, that the dual channel receiver-comparison circuit receives energy from horizontal dipoles 17 and 18 during alternate received energy pulses and during said pulses supplies error signals to azimuth correction circuit 51, which is suitably mechanically connected to antennas 12 and 53 so as to provide automatic tracking in azimuth. During alternate received energy pulses, distinct from those abovementioned, the same dual channel receiver-comparison circuit receives energy from vertical dipoles 40 and 41 and then supplies error signals to elevation correction circuit 52, which is suitably mechanically connected to antennas 12 and 53 so as to provide automatic tracking in elevation.

While I have described particular embodiments of my invention as required by the patent statutes, the principles of the invention are of broader application in ways which will be apparent to those skilled in the art.

What is claimed is:

1. A system for radio echo detection, comprising in combination, means for producing a single directive beam of electromagnetic energy, means for receiving energy of said beam reflected from an object in space, a second means for simultaneously receiving energy of said beam reflected from said object, said second means having its beam pattern axis displaced from that of said first means, two means for amplifying and detecting the energies received by said first and second receiving means separately, means for comparing the magnitudes of the outputs of said amplifying and detecting means, means for converting the output of said comparison means into mechanical signals for automatically maintaining said transmitting and receiving means directed at said object in space, means for maintaining the gains of said two amplifying and detecting means identical, and means for simultaneously varying the gains of said two amplifying and detecting means according to the strength of the energy received by one of said receiving means.

2. A system for radio echo detection, comprising in combination, means for producing a beam of electromagnetic energy, four dipoles for receiving energy of said beam reflected from an object in space, two in the horizontal and two in the vertical plane, said dipoles being mutually disposed 90° from one another and slightly offset from the focal point of a parabolic reflector, thereby producing two horizontal beam patterns whose axes diverge by some fixed angle and two vertical beam patterns whose axes diverge by some fixed angle, two separate amplifying and detecting means, means for comparing the magnitudes of the outputs of said two amplifying and detecting means, means for converting the output of said comparison means to mechanical signals for automatically moving said transmitting means and receiving dipoles in a horizontal plane so as to direct them at said object in space, means for converting the output of said comparison means to mechanical signals for automatically moving said transmitting means and receiving dipoles in a vertical plane so as to direct them at said object in space, means for alternately switching said vertical and horizontal pairs of dipoles to the inputs of said amplifying and detecting means and simultaneously switching the output of said comparison means to the corresponding converting means, means for maintaining the gains of said two amplifying and detecting means identical, and means for varying the gains of said two amplifying and detecting means simultaneously, dependent upon the magnitude of the energy input to one of said amplifying and detecting means.

3. A system for radio echo detection comprising, means for transmitting a directive beam of electromagnetic energy, first and second receiving dipoles in the same plane for simultaneously receiving energy of said beam reflected from an object in space, said dipoles having beam patterns whose axes diverge by some fixed angle, first and second separate identical amplifying and detecting channels, means for applying the energy received by said first dipole to the input side of said first channel, means for simultaneously applying the energy received by said second dipole to the input side of said second channel, means coupled to said first and second channels for comparing the magnitudes of the outputs of said channels, means normally coupled to said comparison means for converting the output of said comparison means to mechanical signals for automatically maintaining said transmitting means and said first and second dipoles directed at said object in space, an automatic gain control circuit coupled to the amplifier of said first channel only, means for periodically applying test signals to the input side of each of said first and second channels simultaneously, and means operative contemporaneous with application of said test signals to switch the output of said comparison means to said automatic gain control circuit, whereby said automatic gain control circuit operates to adjust the gain of the amplifier in said first channel to the extent necessary to render it identical to the gain of the amplifying means of said second channel, the amount of gain adjustment being determined by the magnitude of the output of said comparison means.

4. A system of the type described in claim 3 having means for simultaneously varying the gains of the amplifiers in both channels according to the strength of the reflected energy received by one of said dipoles.

5. A system of the type described in claim 4 further characterized by third and fourth dipoles also having beam patterns whose axes diverge by some fixed angle, said first and second dipoles being in a horizontal plane and said third and fourth dipoles being in a vertical plane, switch means connected to said four dipoles for operatively connecting said first and second dipoles alternately with said third and fourth dipoles to said first and second channels, and means operative in response to the output of said comparison means to direct said third and fourth dipoles and said transmitting means at said object in space.

6. An object detecting and locating system comprising, means for transmitting a single beam of pulsed electromagnetic energy, first and second antenna means for simultaneously receiving energy of said beam reflected from an object in space, said first antenna means having an individual beam pattern whose axis is divergent to the beam pattern axis of said second antenna means, first and second identical receiver channels each including an amplifier, said first antenna means being connected to feed the reflected energy received thereby to said first channel and the second of said antenna means being connected to simultaneously feed the reflected energy received thereby to the second of said channels, a comparison circuit connected to said first and second channels for comparing the outputs of said channels, an automatic gain control circuit connected to the amplifier in said first channel, means for directly feeding a test pulse to each of said channels coincident with the transmission of said beam, and means for operatively connecting said comparison circuit to said automatic gain control circuit during application of said test pulse to said channels, whereby said automatic gain control circuit will adjust the gain of the amplifier of said first channel to obtain a gain identical with the gain of the amplifier in said second channel.

7. An object detecting and locating system of the type described in claim 6 wherein said comparison means normally has its output connected to a tracking circuit, said coupling being interrupted upon application of said test pulses to said channels.

8. An object detecting and locating system of the type described in claim 7, further characterized by an automatic volume control circuit coupled between the amplifiers of said two channels and operative to vary the gain of the amplifiers in both channels simultaneously according to the strength of the reflected energy received by one of said antenna means.

9. A system for detecting the presence and position of an object in space by reception of electromagnetic energy reflected therefrom comprising in combination, a source of electromagnetic energy, means for radiating a directive beam of electromagnetic energy coupled to said source, first and second energy receiving means adapted to simultaneously receive energy reflected from said object, said energy receiving means having energy reception patterns slightly divergent relative to each other, first and second amplifying means, first and second means for simultaneously applying the outputs of said first and second energy receiving means to said first and second amplifying means respectively, a comparison circuit coupled to said first and second amplifying means for comparing the magnitudes of the outputs of said two amplifying means, an automatic gain control circuit having its output connected to one of said amplifiers, mechanical means connected to said beam radiating means and said first and second energy receiving means for directing said beam radiating means and said first and second energy receiving means at substantially the same point in space, an automatic tracking circuit connected to said mechanical means and operative in response to the output of said comparison circuit to actuate said mechanical means whereby to direct said beam radiating means and said first and second energy receiving means at said object in space, switch means connected to said comparison circuit, said automatic gain control circuit, and said automatic tracking circuit, means for simultaneously applying energy from said source to said amplifiers and said switch means during the time interval that said beam is being radiated, said switch means acting to operatively couple said comparison means to said automatic gain control circuit in response to the energy applied thereto, said switch means in the absence of said applied energy serving to operatively couple said comparison circuit to said tracking circuit.

References Cited in the file of this patent
UNITED STATES PATENTS

| Number | Name | Date |
|---|---|---|
| 2,400,641 | Hardy | May 21, 1946 |
| 2,409,448 | Rost | Oct. 15, 1946 |
| 2,409,462 | Zworykin | Oct. 15, 1946 |
| 2,412,612 | Godet | Dec. 17, 1946 |
| 2,427,029 | Stearns | Sept. 9, 1947 |
| 2,464,258 | Prichard | Mar. 15, 1949 |
| 2,468,751 | Hansen et al. | May 3, 1949 |
| 2,506,617 | Sackville | May 9, 1950 |
| 2,508,384 | Gross | May 23, 1950 |
| 2,637,028 | McIlwain | Apr. 28, 1953 |